United States Patent [19]
Geurtsen et al.

[11] Patent Number: 6,068,886
[45] Date of Patent: May 30, 2000

[54] HEAT-TRANSFER LABEL INCLUDING PHENOXY PROTECTIVE LACQUER LAYER

[75] Inventors: Friedrich H. H. Geurtsen, Holliston; Eleanor R. Snay, Worcester; James S. Nugent, Hudson; Samuel H. Stein, Westborough, all of Mass.

[73] Assignee: Avery Dennison Corporation, Pasadena, Calif.

[21] Appl. No.: 09/073,471

[22] Filed: May 6, 1998

Related U.S. Application Data

[62] Division of application No. 08/673,099, Jul. 1, 1996, Pat. No. 5,800,656.

[51] Int. Cl.⁷ .............................. B05D 3/02; C08K 5/07
[52] U.S. Cl. .................... 427/391; 427/393.5; 427/148; 524/356; 524/361
[58] Field of Search .............................. 427/385.5, 148, 427/391, 393.5; 524/356, 361

[56] References Cited

U.S. PATENT DOCUMENTS

| | | | |
|---|---|---|---|
| 4,241,115 | 12/1980 | Temin | 427/384 |
| 4,294,641 | 10/1981 | Reed et al. | 427/148 |
| 4,626,463 | 12/1986 | Fujishiro et al. | 428/143 |
| 4,748,194 | 5/1988 | Geeck | 523/427 |
| 5,047,451 | 9/1991 | Barrett et al. | 524/361 |
| 5,891,824 | 4/1999 | Simpson et al. | 503/227 |
| 5,942,330 | 8/1999 | Kelley | 428/423.1 |

OTHER PUBLICATIONS

Technical literature, UCAR phenoxy resins, Union Carbide Corporation, Hackensack, NJ, publicly available before the filing of the present application (no date available).

*Primary Examiner*—Shrive Beck
*Assistant Examiner*—Kirsten A. Crockford
*Attorney, Agent, or Firm*—Kriegsman & Kriegsman

[57] ABSTRACT

A heat-transfer label including a phenoxy lacquer layer. In one embodiment, the label is designed for use on silane-treated glass containers of the type that are subjected to pasteurization conditions. The label includes a support portion and a transfer portion, the transfer portion being positioned over the support portion. The support portion includes a sheet of paper overcoated with a release layer of polyethylene. The transfer portion includes an organic solvent-soluble phenoxy protective lacquer layer, an organic solvent-soluble polyester ink layer over the protective lacquer layer, and a water-dispersible acrylic adhesive layer over the ink layer.

9 Claims, 1 Drawing Sheet

HEAT-TRANSFER LABEL INCLUDING PHENOXY PROTECTIVE LACQUER LAYER

CROSS-REFERENCE TO RELATED APPLICATIONS

The present application is a divisional application of presently U.S. Patent application Ser. No. 08/673,099, filed Jul. 1, 1996, now U.S. Pat. No. 5,800,656.

BACKGROUND OF THE INVENTION

The present invention relates generally to heat-transfer labels and more particularly to a novel heat-transfer label including a phenoxy protective lacquer layer.

Heat-transfer labels are commonly used in the decorating and/or labelling of commercial articles, such as, and without limitation to, containers for beverages (including alcoholic beverages such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed.

One well-known type of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt so that the paper sheet can be released from the wax layer. After transfer of the design to the article, the paper sheet is immediately removed, leaving the design firmly affixed to the article and the wax layer exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer (thereby enabling the ink design layer therebeneath to be better observed) and which enhances the protective properties of the transferred wax release.

In some heat-transfer labels, an adhesive layer (e.g., solvent-soluble polyamide, acrylic, or polyester) is deposited over the ink design to facilitate adhesion of the label onto a receiving article. An example of a heat-transfer label having an adhesive layer is disclosed in U.S. Pat. No. 4,548,857, inventor Galante, which issued Oct. 22, 1985, and which is incorporated herein by reference. Additionally, in some heat-transfer labels, a protective lacquer layer is interposed between the wax release layer and the ink layer. An example of such a label is disclosed in U.S. Pat. No. 4,426,422, inventor Daniels, which issued Jan. 17, 1984, and which is incorporated herein by reference.

One problem that has been noted with heat-transfer labels of the type described above containing a wax release layer is that, quite often, a degree of hazing or a "halo" is noticeable over the transferred label when the transfer is made onto clear materials. This "halo" effect, which persists despite post-flaming, is a result of the nature of the wax coating around the outer borders of the transferred ink design layer. Hazing due to the wax release layer may also appear in "open-copy" areas of the label, i.e., areas of the label where no ink is present between the adhesive and protective lacquer layers, and also represents a problem.

Accordingly, to overcome the aforementioned "halo" effect, considerable effort has been expended in replacing or obviating the need for a wax release layer. One such wax-less, heat-transfer label is disclosed in U.S. Pat. No. 3,922,435, inventor Asnes, which issued Nov. 25, 1975. In the aforementioned patent, the layer of wax is replaced with a layer of a non-wax resin. This non-wax resinous layer is referred to in the patent as a dry release since it does not transfer to the article along with the ink design layer. In a preferred embodiment of the patent, the non-wax resinous layer comprises a thermoset polymeric resin, such as cross-linked resins selected from the group consisting of acrylic resins, polyamide resins, polyester resins, vinyl resins and epoxy resins.

Another example of a wax-less, heat-transfer label is disclosed in U.S. Pat. No. 4,935,300, inventors Parker et al., which issued Jun. 19, 1990, and which is incorporated herein by reference. In the aforementioned patent, the label, which is said to be particularly well-suited for use on high density polyethylene, polypropylene, polystyrene, polyvinylchloride and polyethylene terephthalate surfaces or containers, comprises a paper carrier web which is overcoated with a layer of polyethylene. A protective lacquer layer comprising a polyester resin and a relatively small amount of a non-drying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described wax-less, heat-transfer label eliminates the wax-related "halo" effect discussed previously, said label does not quite possess the same release characteristics of heat-transfer labels containing a wax release layer. Accordingly, another type of heat-transfer label differs from the heat-transfer label disclosed in U.S. Pat. Nos. 4,935,300, only in that a very thin layer or "skim coat" of a waxlike material is interposed between the polyethylene release layer and the protective lacquer layer to improve the release of the protective lacquer from the polyethylene-coated carrier web. The thickness of the skim coat corresponds to approximately 0.1–0.4 lbs. of the wax-like material spread onto about 3000 square feet of the polyethylene release layer.

The aforementioned type of heat-transfer label may be used to decorate a variety of surfaces and materials including glass containers. Glass containers are frequently, although not invariably, pre-treated (typically by the container manufacturer) with polyethylene, oleic acid, stearate or a similar material whose function is to enhance abrasion resistance and lubricity. Such containers, whether or not previously subjected to the foregoing type of pre-treatment (or whether or not such a pre-treatment is later removed from the container), are typically treated, prior to decoration, with a silane adhesion promoter of the type described in U.S. Pat. No. 3,907,974, inventor Smith, which issued Sep. 23, 1975 and which is incorporated herein by reference.

An example of a heat-transfer label which has been used by the assignee of the present application to label glass containers comprises a paper carrier web overcoated with a layer of polyethylene. A skim coat is coated onto the polyethylene-coated web. A polyester/vinyl protective lacquer layer is printed onto the skim coat. A polyester/vinyl ink design layer is then printed onto the protective lacquer layer. A heat-activatable, polyester adhesive layer is then printed onto the ink design layer.

Although the aforementioned heat-transfer label is generally acceptable for labelling glass containers, said label is not optimal in all respects. For example, the present inventors have recognized a need for a protective lacquer that is more abrasion and/or heat resistant than the previously used polyester/vinyl protective lacquer and that can be printed on with better print quality than the above-discussed existing protective lacquers.

SUMMARY OF THE INVENTION

It is an object of the present invention to provide a novel heat-transfer label.

It is another object of the present invention to provide a heat-transfer label as described above that overcomes at least some of the problems discussed above in connection with previous heat-transfer labels.

It is still another object of the present invention to provide a novel protective lacquer layer for use in a heat-transfer label.

In furtherance of the above and other objects that are herein disclosed or are apparent from the present specification, there is provided a heat-transfer label which comprises (a) a support portion; and (b) a transfer portion over said support portion for transfer of the transfer portion from the support portion to an article upon application of heat to the support portion while the transfer portion is placed into contact with the article, said transfer portion comprising (i) a protective lacquer layer, said protective lacquer layer comprising a phenoxy lacquer; (ii) an ink layer over said protective lacquer layer; and (iii) an adhesive layer over said ink layer.

The aforementioned heat-transfer label may be used on a variety of articles including, but not limited to, silane-treated glass containers, polyethylene terephthalate (PET) containers, polyethylene napthalate (PEN) containers, aluminum cans and the like. The ink layer of the foregoing heat-transfer label preferably comprises a polyester ink, a polyester/vinyl ink, a polyamide ink and/or an acrylic ink. The adhesive layer of the above heat-transfer label preferably comprises a conventional adhesive (e.g., solvent-soluble polyester, acrylic or polyamide adhesives) or an adhesive of the type present in a water-based adhesive emulsion or a water-based adhesive dispersion.

According to a first preferred embodiment of the invention, the heat-transfer label is particularly well-suited for use on silane-treated glass containers of the type that are subjected to pasteurization conditions (regardless of whether the glass containers have previously been pre-treated with polyethylene, oleic acid, stearate or the like), said heat-transfer label comprising (a) a support portion comprising a sheet of paper overcoated with a release layer of polyethylene; and (b) a transfer portion over said support portion for transfer of the transfer portion from the support portion to an article upon application of heat to the support portion while the transfer portion is placed into contact with the article, said transfer portion comprising (i) a phenoxy protective lacquer layer; (ii) an ink layer over said protective lacquer layer; and (iii) an adhesive layer over said ink layer, said adhesive layer comprising an adhesive of the type present in a water-based adhesive emulsion or a water-based adhesive dispersion. Preferably, the aforementioned ink layer is made up of a polyester ink.

In addition to being directed to the above-described heat-transfer labels, the present invention is also directed to the transfer portion of the heat-transfer labels, as well as to protective lacquer compositions used to form the protective lacquer layers of the heat-transfer labels, to methods for forming the protective lacquer layers with the aforementioned protective lacquer compositions, to the protective lacquer layers formed using the foregoing protective lacquer compositions, and to methods of labelling articles, such as silane-treated glass containers, with the above-described heat-transfer labels.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
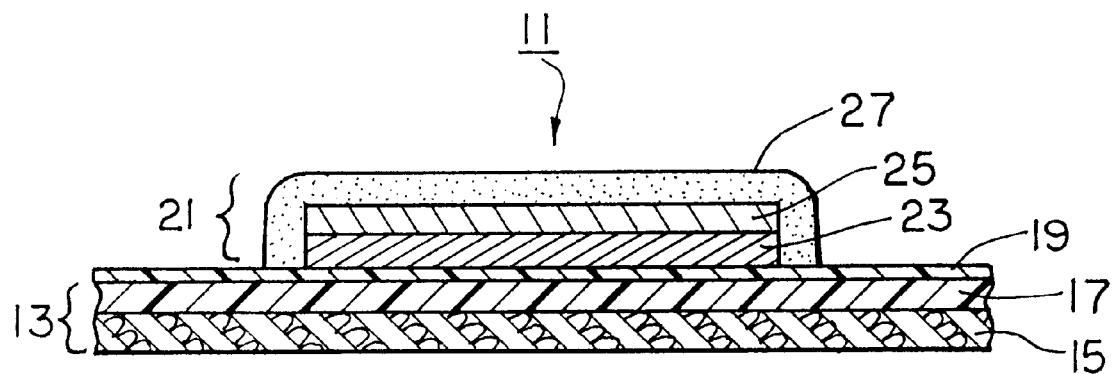
FIG. 1 is a schematic section view of a first embodiment of a heat-transfer label that is particularly well-suited for, but not limited to, use on silane-treated glass containers of the type that are subjected to pasteurization conditions, the heat-transfer label being constructed according to the teachings of the present invention.

Referring now to FIG. 1, there is shown a schematic section view of a first embodiment of a heat-transfer label that is particularly well-suited for, but not limited to, use on silane-treated glass containers of the type that are subjected to pasteurization conditions (e.g., silane-treated glass containers used to hold pasteurized beer, the beer being pasteurized while in the glass containers), the heat-transfer label being constructed according to the teachings of the present invention and being represented generally by reference numeral 11. (It is to be understood that, for purposes of the present specification and claims, the expression "silane-treated glass containers" refers both to silane-treated glass containers that have been pre-treated with an abrasion-resistance material, such as polyethylene, oleic acid, stearate or the like, and to silane-treated glass containers that have not been so pre-treated.)

Label comprises a support portion 13. Support portion 13, in turn, comprises a carrier web 15 overcoated with a polyethylene layer 17. Carrier web 15 is typically made of paper or a similarly suitable substrate. Details of polyethylene layer 17 are disclosed in U.S. Pat. No. 4,935,300, discussed above, and in U.S. Pat. No. 4,927,709, inventors Parker et al., which issued on May 22, 1990, which is incorporated herein by reference.

Label 11 also comprises a skim coat 19 of the type described above, which is coated directly on top of the entirety of polyethylene layer 17. During label transfer, a small portion of skim coat 19 may be transferred along with the transfer portion of label 11 onto the article being labelled, the amount of skim coat 19 transferred onto the article being labelled not being readily discernible.

Label 11 further comprises a transfer portion 21. Transfer portion 21, in turn, includes a protective lacquer layer 23 printed directly on top of a portion of skim coat 19, an ink design layer 25 printed onto a desired area of lacquer layer 23, and a heat-activatable adhesive layer 27 printed onto design layer 25.

Protective lacquer layer 23 comprises one or more phenoxy lacquer resins. To form lacquer layer 23, a lacquer composition comprising a phenoxy lacquer resin and one or more suitable volatile solvents are deposited onto a desired area of skim coat 19, preferably by gravure printing or a similar technique. After deposition of the lacquer composition onto the desired area of skim coat 19, the volatile solvent(s) evaporate(s), leaving only the non-volatile components to make up lacquer layer 23. Examples of phenoxy lacquer resins include the UCAR®Phenoxy Resins (Union Carbide Corporation, Hackensack, N.J.), which have the following chemical structure:

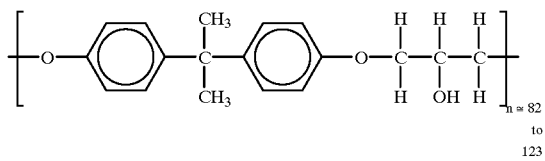

A particularly preferred UCAR®Phenoxy Resin is PKHH, a medium weight grade of the above structure which, at 40% solids, by weight, in methyl ethyl ketone (MEK), has a solution viscosity of 4500 to 7000 mPa·s(cP). Where the lacquer resin is PKHH, the lacquer composition preferably comprises about 25%, by weight, PKHH; about 46.6%, by weight, methyl ethyl ketone; about 23.4%, by weight, toluene; and about 5.0%, by weight, Dowanol PM propylene glycol methylether (Dow Chemical).

Ink design layer 25 of transfer portion 21 comprises a polyester/vinyl ink, a polyamide ink, an acrylic ink and/or a polyester ink. Ink design layer 25 is formed in the conventional manner by depositing, by gravure printing or the like, an ink composition comprising a resin of the type described above, a suitable pigment or dye and one or more suitable volatile solvents onto one or more desired areas of lacquer layer 23. After application of the ink composition onto lacquer layer 23, the volatile solvent component(s) of the ink composition evaporate(s), leaving only the non-volatile ink components to form layer 25. An example of a suitable resin for use in forming a polyester ink is ViTEL®2700 (Shell Chemical Company, Akron, Ohio)—a copolyester resin having a high tensile strength (7000 psi) and a low elongation (4% elongation). A ViTEL®2700-based polyester ink composition may comprise 18% ViTEL®2700, 6% pigment, 30.4% n-propyl acetate (NP Ac) and 45.6% toluene. As can readily be appreciated, ViTEL®2700 is, by no means, the only polyester resin that may be used to formulate a polyester ink, and solvent systems, other than an NP Ac:toluene system, may be suitable for use with ViTEL®2700, as well as with other polyester resins.

The present inventors have observed that polyester inks print unexpectedly well on phenoxy lacquer layers.

Adhesive layer 27 of transfer portion 21 comprises an acrylic adhesive of the type present in a water-based adhesive emulsion or a water-based adhesive dispersion (as contrasted with a water-soluble or an organic solvent-soluble). Adhesive layer 27 is formed by depositing onto ink layer 25, by gravure printing or the like, an adhesive composition comprising a water-based acrylic adhesive emulsion or dispersion and a surface tension lowering agent. After application of the adhesive composition onto ink layer 25, the volatile components of the composition (e.g., water, alcohol) evaporate, leaving only the non-volatile components thereof to form layer 27.

Examples of the water-based acrylic emulsion include RHOPLEX® GL-618 emulsion (Rohm and Haas, Philadelphia, Pa.)—a water-based all-acrylic elastomeric polymer emulsion having a solids content of approximately 46.5–47.5%, by weight, a pH of about 7.5–9.5, a specific gravity of about 1.07 at 25° C., a weight of about 8.9 pounds/U.S. gallon, a Brookfield LVF Viscosity at 30 rpm, #2 spindle, of about 300–500 cps, a minimum film formation temperature of about 20° C. and a glass transition temperature of about 27° C.; JONCRYL 77 (S. C. Johnson & Son, Inc., Racine, Wis.)—an acrylic polymer emulsion having a solids content of approximately 45%, by weight, a pH of about 8.3, a weight of about 8.7 pounds/U.S. gallon, a Brookfield viscosity of about 450 cps and a glass transition temperature of about 21° C.; JONBOND®751 (S. C. Johnson & Son, Inc., Racine, Wis.)—an acrylic emulsion having a solids content of approximately 46±1%, by weight, a pH of about 7.4–7.8, a weight of about 8.7 pounds/gallon, a Brookfield LVF viscosity of 700±200 cps and an activation temperature of approximately 93.3° C.; and SEQUABOND®VS 9010 (Sequa Chemicals, Inc., Chester, S.C.)—a polymer emulsion having a solids content of approximately 47%, a pH of about 8.5, a viscosity of about 600 cps, a weight of about 8.7 pounds/gallon and a glass transition temperature of about −30° C.

The purpose of the above-identified surface tension lowering agent is to reduce the surface tension of the water-based emulsion sufficiently to enable the composition to be deposited (e.g., printed) onto ink layer 25 in the form of a substantially continuous film—in other words, to prevent the composition from striating or stippling when deposited on top of ink layer 25 during printing. Suitable surface tension lowering agents include, but are not limited to, (i) alcohols that are efficient at lowering surface tension and (ii) relatively hydrophobic, low-foaming, asymmetrical surfactants of low molecular weight. Examples of surface tension lowering agents include isopropyl alcohol, n-propyl alcohol, polypropylene oxide-ethylene oxide-polypropylene oxide and 2,4,7,9-tetramethyl-5-decyne-4,7-diol (commercially available from Air Products, Pittsburgh, Pa. as Surfynol®104 surfactant). It should be noted, however, that the amount of alcohol in the composition is small compared to the amount of water in the composition as the alcohol is not used to put the resin into solution.

In addition to reducing surface tension, the above-described surface tension lowering agent, as well as the additional water added to the emulsion and surface tension lowering agent, also serves to lower the yield value (i.e., rheology) of the composition to facilitate printing of the composition.

The following are illustrative examples of adhesive compositions that may be used to form adhesive layer 27, it being understood that other adhesive compositions of the general type described above may also be used to form adhesive layer 27 and that the examples given below are in no way intended to be limiting:

EXAMPLE 1

| | |
|---|---|
| RHOPLEX ® GL-618 emulsion | approximately 74.5% |
| Isopropyl alcohol | approximately 17.4% |
| Water | approximately 7.4% |
| Water soluble fluorescent material | approximately 0.6% |

Mix together the isopropyl alcohol and water. While stirring the acrylic emulsion, add the alcohol/water mixture thereto. Then, add the fluorescent material (which is added to the formulation merely for registration purposes during printing.) The surface tension of the formulation is about 28 dynes/cm.

EXAMPLE 2

| | |
|---|---|
| JONCRYL 77 emulsion | approximately 83% |
| Water | approximately 17% |
| Water soluble fluorescent material | <1% |

EXAMPLE 3

| | |
|---|---|
| JONCRYL 77 emulsion | approximately 62.1% |
| RHOPLEX ® GL-618 emulsion | approximately 20.8% |
| Isopropyl alcohol | approximately 11.4% |
| Water | approximately 4.9% |
| Water soluble fluorescent material | approximately 0.6% |

EXAMPLE 4

| | |
|---|---|
| Joncryl 77 emulsion | approximately 80% |
| Isopropyl alcohol | approximately 14% |
| Water | approximately 6% |
| Water soluble fluorescent material | <1% |

Mix together the isopropyl alcohol and water. While stirring the acrylic emulsion, add the alcohol/water mixture thereto. Then, add the fluorescent material.

EXAMPLE 5

| | |
|---|---|
| Sequabond ® VS 9010 | approximately 79.5% |
| Isopropyl alcohol | approximately 13.9% |
| Water | approximately 5.9% |
| Water soluble fluorescent material | approximately 0.6% |

Mix together the isopropyl alcohol and water. While stirring the acrylic emulsion, add the alcohol/water mixture thereto. Then, add the fluorescent material.

EXAMPLE 6

| | |
|---|---|
| RHOPLEX ® GL-618 emulsion | approximately 87.5% |
| n-propyl alcohol | approximately 10.2% |
| Water | approximately 1.4% |
| Water soluble fluorescent material | approximately 0.7% |

While the acrylic emulsion is under agitation, add the n-propyl alcohol thereto. Next, add the water to the mixture. Then, add the fluorescent material to the mixture.

EXAMPLE 7

| | |
|---|---|
| RHOPLEX ® GL-618 emulsion | approximately 73.4% |
| Isopropyl alcohol | approximately 17.1% |
| Water | approximately 7.3% |
| Triton ® X114 nonionic surfactant (Union Carbide, Danbury, CT) | approximately 1.5% |
| Water soluble fluorescent material | approximately 0.6% |

Mix together the isopropyl alcohol, Triton®X114 and water. While stirring the acrylic emulsion, add the alcohol/Triton®X114/water mixture thereto. Then, add the fluorescent material.

EXAMPLE 8

| | |
|---|---|
| JONBOND ® 751 emulsion | approximately 84.5% |
| n-propyl alcohol | approximately 14.8% |
| Water soluble fluorescent material | approximately 0.6% |

While the acrylic emulsion is under agitation, add the n-propyl alcohol thereto. Then, add the fluorescent material to the mixture.

EXAMPLE 9

| | |
|---|---|
| JONCRYL 77 emulsion | approximately 59.6% |
| JONBOND ® 751 emulsion | approximately 19.9% |
| Isopropyl alcohol | approximately 13.9% |
| Water | approximately 5.9% |
| Water soluble fluorescent material | approximately 0.6% |

Mix together the isopropyl alcohol and water. While stirring together the two acrylic emulsions, add the alcohol/water mixture thereto. Then, add the fluorescent material.

EXAMPLE 10

| | |
|---|---|
| JONCRYL 77 emulsion | approximately 77.6% |
| Surfynol ® 104PA | approximately 4.4% |
| (50% wt Surfynol ® 104 in isopropyl alcohol) | |
| Isopropyl alcohol | approximately 11.6% |
| Water | approximately 5.8% |
| Water soluble fluorescent material | approximately 0.6% |

Mix together the isopropyl alcohol and water. While stirring together the acrylic emulsion, add the alcohol/water mixture thereto. Next, add the Surfynol®104PA. Then, add the fluorescent material.

EXAMPLE 11

| | |
|---|---|
| JONCRYL 77 emulsion | approximately 19.9% |
| JONBOND ® 751 emulsion | approximately 59.6% |
| Isopropyl alcohol | approximately 13.9% |
| Water | approximately 5.9% |
| Water soluble fluorescent material | approximately 0.6% |

Mix together the isopropyl alcohol and water. While stirring together the two acrylic emulsions, add the alcohol/water mixture thereto. Then, add the fluorescent material.

EXAMPLE 12

| | |
|---|---|
| JONCRYL 77 emulsion | approximately 84.1% |
| Surfynol ® 104NP | approximately 10.5% |
| (50% wt Surfynol ® 104 in n-propyl alcohol) | |
| Water | approximately 4.7% |
| Water soluble fluorescent material | approximately 0.6% |

While stirring the emulsion, add the water thereto. Next, add the Surfynol®104NP. Then, add the fluorescent material.

Label 11 may be used in the conventional manner by contacting adhesive layer 27 to a desired article, such as a glass container, while applying sufficient heat to the bottom of carrier web 15 so as to cause transfer portion 21 to be released from support portion 13 and so as to cause adhesive layer 27 to become heat-activated for bonding to the desired article.

The present inventors have noted that, when label 11 is applied to silane-treated glass containers and said labelled containers are subsequently subjected to pasteurization conditions, one resultant advantage is that less "hazing" or lack of clarity in open-copy areas between the protective lacquer and adhesive layers is observed than is typically the case when conventional adhesives are used (with best results being observed when the adhesive compositions of Examples 1 and 4–12 are used to form adhesive layer 27). The present inventors have also noted that label 11 adheres well to silane-treated glass containers and that the constituent layers of label 11 possess excellent interlayer adhesion. (Interlayer and article adherence are typically tested by a "tape test," i.e., a test which involves applying a piece of adhesive tape to a label on an article, removing the piece of tape and checking the integrity of the label.) Moreover, because the above-described adhesive composition is an emulsion, as opposed to a solution, higher molecular weight resins possessing better adhesion may be used in the present emulsion than could be used in comparable solutions (due to viscosity constraints on printing with such solutions)—thereby leading to improved adhesion properties between the label and the container. Furthermore, the present inventors have noted that label 11 possesses a high degree of abrasion and heat resistance. Finally, the present inventors have noted that the printed quality of the ink design layer on the present phenoxy lacquer layer is better than that typically achieved on other lacquer layers.

It should be noted, however, that if the article being labelled is not intended to be subjected to pasteurization conditions or that if the presence of "hazing" in the label is not unacceptable, alternative adhesives (e.g., conventional solvent-soluble polyester adhesives) may be used instead of adhesives of the type present in water-based adhesive emulsions or dispersions, provided that such alternative adhesives adhere to the article and that the label comprising the alternative adhesive exhibits satisfactory interlayer adhesion. An example of an adhesive composition that may be used to form a solvent-soluble polyester adhesive of the type identified above comprises 10.70%, by weight, ViTEL®2300 polyester resin; 10.70%, by weight, ViTEL®2700 polyester resin; 1.1%, by weight, BENZOFLEX S404 plasticizer; 1.1%, by weight, HULS 512 adhesion promoter; 19.20%, by weight, toluene; and 57.10%, by weight, methyl ethyl ketone. After printing, the volatile components of the aforementioned adhesive composition evaporate, leaving only the non-volatile components thereof.

A heat-transfer label comprising a support portion of polyethylene-coated paper overcoated with a skim coat and a transfer portion which includes the above-described phenoxy lacquer, a polyester ink and the foregoing solvent-soluble polyester adhesive has been used to label silane-treated glass containers of the type not subjected to pasteurization-like conditions. Such a label has exhibited good abrasion resistance and good interlayer and article adherence (as observed by tape tests of the type described above).

Figure 2:
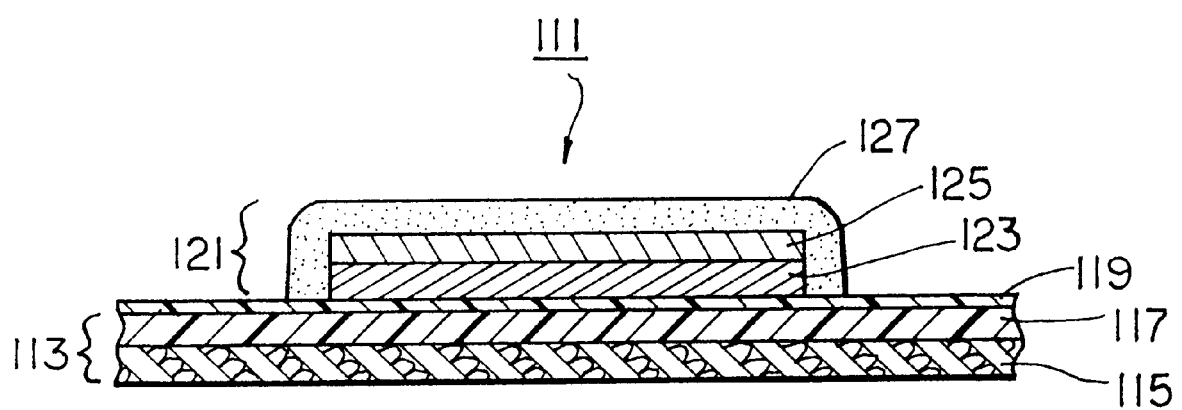
FIG. 2 is a schematic section view of a second embodiment of a heat-transfer label that is particularly well-suited for, but not limited to, use on aluminum cans of the type that have been treated with a highly-lubricating thermoset acrylic coating used to prevent scratching and abrasion of such cans, the heat-transfer label being constructed according to the teachings of the present invention.

Referring now to FIG. 2, there is shown a schematic section view of a second embodiment of a heat-transfer label that is particularly well-suited for, but not limited to, use on aluminum cans of the type that have been treated with a highly-lubricating thermoset acrylic coating or varnish used to prevent scratching and abrasion of such cans (and which may or may not have also been treated with a white ink), the heat-transfer label being constructed according to the teachings of the present invention and being represented generally by reference numeral 111.

Label 111 comprises a support portion 113. Support portion 113 is identical to support portion 13 of label 11 and comprises a carrier web 115 overcoated with a polyethylene layer 117. Label 111 also comprises a skim coat 119 which is identical to skim coat 19 of label 11.

Label 111 further comprises a transfer portion 121. Transfer portion 121, in turn, includes a protective lacquer layer 123 printed directly on top of a portion of skim coat 119, an ink design layer 125 printed onto a desired area of lacquer layer 123, and a heat-activatable adhesive layer 127 printed onto design layer 125.

Protective lacquer layer 123 comprises an acrylic lacquer resin, a polyester lacquer resin, a polyester/vinyl lacquer resin and/or a phenoxy lacquer resin of the type described above. To form lacquer layer 123, a lacquer composition comprising one or more lacquer resins and one or more suitable volatile solvents are deposited onto a desired area of skim coat 119, preferably by gravure printing or a similar technique. After deposition of the lacquer composition on the desired area of skim coat 119, the volatile solvent(s) evaporate(s), leaving only the non-volatile components thereof to make up lacquer layer 123. A particularly preferred lacquer layer 123 comprises a combination of ELVACITE®2013 acrylic resin (ICI Acrylics Inc., Wilmington, Del.), a low molecular weight methyl/n-butyl methacrylate copolymer having an inherent viscosity of 0.17 (as measured in a solution containing 0.25 g of polymer in 50 ml methylene chloride, measured at 20° C. using a No. 50 Cannon-Fenske Viscometer), and ELVACITE®2014 acrylic resin (ICI Acrylics Inc., Wilmington, Del.), a medium molecular weight methyl methacrylate copolymer having an inherent viscosity of 0.40 (as measured in the manner described above).

Ink design layer 125 of transfer portion 121, like ink design layer 25 of label 11, comprises an acrylic ink, a polyester ink, a polyester/vinyl ink and/or a polyamide ink. Ink design layer 125 may be formed in the same manner as ink design layer 25 of label 11. A particularly preferred type of ink for ink design layer 125 are acrylic inks.

Adhesive layer 127 of transfer portion 121 comprises an acrylic adhesive of the type present in a water-based adhesive dispersion or emulsion. Adhesive layer 127 is formed by depositing onto ink layer 125, by gravure printing or the like, an adhesive composition comprising a water-based acrylic adhesive emulsion or dispersion and a surface tension lowering agent. Suitable adhesive compositions useful in forming adhesive layer 127 include the adhesive compositions of Examples 2 through 5 and 8 through 12 above, with the adhesive compositions of Examples 4 and 12 being preferred. After application of the adhesive composition onto ink layer 125 the volatile components of the composition (e.g., water, certain alcohols) evaporate, leaving only the non-volatile solid components thereof (e.g., resin, certain surfactants) to form layer 127.

Label 111 may be used in the conventional manner by contacting adhesive layer 127 to a desired article while applying sufficient heat to the bottom of carrier web 115 so as to cause transfer portion 121 to be released from support portion 113 and so as to cause adhesive layer 127 to become heat-activated for bonding to the desired article.

The present inventors have noted that, when label 111 is applied to aluminum cans of the type described above, excellent adhesion is achieved between label 111 and the aluminum can. In addition, the present inventors have noted that label 111 exhibits excellent interlayer adhesion of its constituent layers and that label 111 possesses excellent abrasion resistance.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A protective lacquer composition consisting essentially of (a) a phenoxy lacquer having the structure

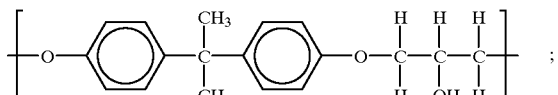

and (b) an organic solvent consisting of 2:1 (w/w) methyl ethyl ketone:toluene.

2. The protective lacquer composition as claimed in claim 1 wherein said phenoxy lacquer at 40% solids, by weight, in methyl ethyl ketone (MEK) has a solution viscosity of 4500 to 7000 mPa·s(cP).

3. The protective lacquer composition as claimed in claim 2 wherein said phenoxy lacquer constitutes about 25%, by weight, of said protective lacquer composition.

4. The protective lacquer composition as claimed in claim 3 wherein methyl ethyl ketone constitutes about 46.6%, by weight, of said protective lacquer composition and wherein toluene constitutes about 23.4%, by weight, of said protective lacquer composition.

5. A method of forming a protective lacquer layer on a substrate, said method comprising the steps of:

(a) providing a protective lacquer composition as claimed in claim 3;

(b) depositing a layer of said protective lacquer composition onto the substrate; and (c) evaporating any volatile components of said protective lacquer composition from said layer.

6. The method as claimed in claim 5 wherein the substrate is a support portion of a heat-transfer label.

7. A protective lacquer composition consisting essentially of:

(a) a phenoxy lacquer having the structure

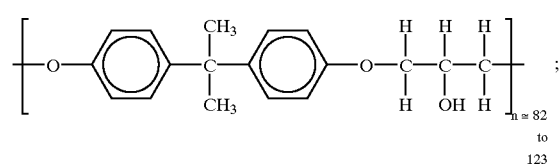

(b) an organic solvent consisting of 2:1 (w/w) methyl ethyl ketone:toluene; and (c) propylene glycol methylether.

8. The protective lacquer composition as claimed in claim 7 wherein said phenoxy lacquer constitutes about 25%, by weight, of said protective lacquer composition, wherein methyl ethyl ketone constitutes about 46.6%, by weight, of said protective lacquer composition, wherein toluene constitutes about 23.4%, by weight, of said protective lacquer composition and wherein propylene glycol methylether constitutes about 5.0%, by weight, of said protective lacquer composition.

9. A protective lacquer composition consisting essentially of:

(a) a phenoxy lacquer having the structure

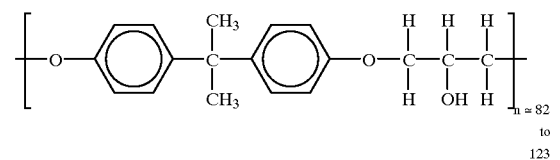

and (b) an organic solvent consisting of 2:1 (w/w) methyl ethyl ketone:toluene (c) wherein said phenoxy lacquer constitutes about 25%, by weight, of said protective lacquer composition.

* * * * *